J. M. CLARK & G. A. GUSTAFSON.
METALLIC RING.
APPLICATION FILED MAR. 18, 1912.

1,052,462.

Patented Feb. 11, 1913.

Witnesses.
P. W. Stone.
B. G. Richards.

Inventors
John M. Clark
and
Gustaf A. Gustafson
By Joshua R. H. Potts
their Attorney.

UNITED STATES PATENT OFFICE.

JOHN M. CLARK, OF CHICAGO, AND GUSTAF A. GUSTAFSON, OF HARVEY, ILLINOIS.

METALLIC RING.

1,052,462.　　　　　Specification of Letters Patent.　　Patented Feb. 11, 1913.

Application filed March 18, 1912.　Serial No. 684,379.

*To all whom it may concern:*

Be it known that we, JOHN M. CLARK and GUSTAF A. GUSTAFSON, citizens of the United States, and residents, respectively, of the city of Chicago, county of Cook, and State of Illinois, and of the city of Harvey, county of Cook, and State of Illinois, have invented certain new and useful Improvements in Metallic Rings, of which the following is a specification.

Our invention relates to improvements in metallic rings, and has for its object the provision of a ring of this character of simple construction and efficient in operation.

The invention consists in the combinations and arrangements of parts hereinafter described and claimed.

The invention will be best understood by reference to the accompanying drawings forming a part of this specification, and in which—

Figure 1:
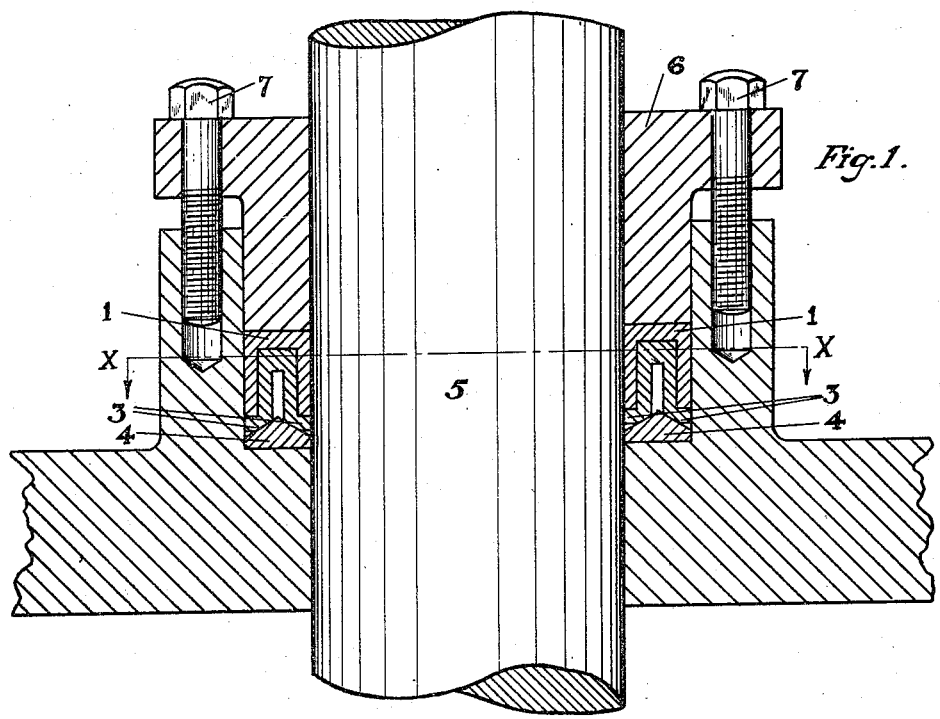
Figure 2:
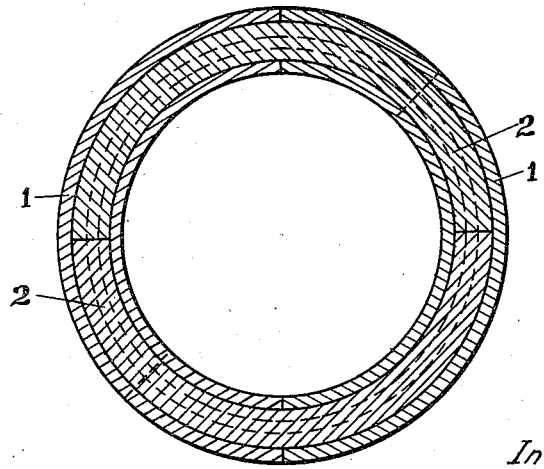

Figure 1 is a longitudinal section showing the ring in position of use, and Fig. 2 a section of the ring taken on substantially line x—x of Fig. 1.

The preferred form of construction, as illustrated in the drawings, comprises an outer ring 1, substantially U-shaped in cross section and formed in two parts. An inner ring 2 is fitted within ring 1 and is substantially U-shaped in cross section and formed in two parts, the parts of ring 2 being arranged with the joint between the ends of said part out of registration with the joint between the ends of the parts of ring 1, or more specifically, in a plane at right angles to the plane of the joints between the ends of the parts of ring 1. The ends of the limbs of ring 2 are provided with flanges 3 resting over the ends of the limbs of ring 1. The outer face of ring 2 is beveled or concave to fit a spreading ring 4 which is wedge shaped in cross section, as shown, and formed in two parts, as indicated by the dotted lines in Fig. 2.

In use, the packing ring is placed around a piston rod or similar member 5 in the usual stuffing box provided for this purpose.
A gland 6 fits within the stuffing box and is tightened therein by means of bolts 7. It will be observed that as bolts 7 are tightened spreading ring 4 will spread the limbs of rings 1 and 2 to contact tightly with the sides of piston rod 5 and the inner sides of the stuffing box so as to make a tight joint.
The flanges 3 imprisoned between spreading ring 4 and the ends of the limbs of ring 1, will be compressed and caused to flow slightly, thus increasing the effectiveness of the packing. By making the respective rings in two parts, they may be assembled around a piston rod or similar member while the same is in operative position, and by arranging the joints between the ends of the ring parts out of registration with each other, the joint is broken and thus leakage through the joint is prevented.

While we have illustrated and described the preferred form of construction for carrying our invention into effect, this is capable of variation and modification without departing from the spirit of the invention. We, therefore, do not wish to be limited to the exact details of construction set forth, but desire to avail ourselves of such variations and modifications as come within the scope of the appended claims.

Having described our invention, what we claim as new and desire to secure by Letters Patent, is:

1. A metallic packing ring comprising an outer metallic ring substantially U-shaped in cross section and formed in a plurality of parts; an inner metallic ring substantially U-shaped in cross section and formed in a plurality of parts fitting within said outer ring with the joints between the ends of said ring parts out of registration with each other; and means for spreading the limbs of said rings, substantially as described.

2. A metallic packing ring comprising an outer metallic ring substantially U-shaped in cross section and formed in two parts; an inner metallic ring substantially U-shaped in cross section and formed in two parts fitting within said outer ring with the joints between the ends of said ring parts out of registration with each other; and means for spreading the limbs of said rings, substantially as described.

3. A metallic packing ring comprising an outer metallic ring substantially U-shaped in cross section and formed in a plurality of parts; an inner metallic ring substantially U-shaped in cross section and formed in a plurality of parts fitting within said outer ring with the joints between the ends of said ring parts out of registration with each other; and a ring, wedge shaped in cross section and formed in a plurality of parts, said ring being arranged and adapted to spread the limbs of said rings apart upon the application of pressure, substantially as described.

4. A metallic packing ring comprising an outer metallic ring substantially U-shaped in cross section and formed in two parts; an inner metallic ring substantially U-shaped in cross section and formed in two parts fitting within said outer ring with the joints between the ends of said ring parts out of registration with each other; and a ring, wedge shaped in cross section and formed in a plurality of parts, said ring being arranged and adapted to spread the limbs of said rings apart upon the application of pressure, substantially as described.

5. A metallic packing ring comprising an outer metallic ring substantially U-shaped in cross section and formed in two parts; an inner metallic ring substantially U-shaped in cross section and formed in two parts fitting within said outer ring with the joints between the ends of said ring parts out of registration with each other; flanges on the ends of the limbs of said inner ring and resting over the ends of the limbs of said outer ring; and a ring, wedge shaped in cross section and formed in two parts, said ring being arranged and adapted to spread the limbs of said rings apart upon the application of pressure, substantially as described.

In testimony whereof we have signed our names to this specification in the presence of two subscribing witnesses.

JOHN M. CLARK.
GUSTAF A. GUSTAFSON.

Witnesses:
  JOSHUA R. H. POTTS,
  ARTHUR A. OLSON.

---

Copies of this patent may be obtained for five cents each, by addressing the "Commissioner of Patents, Washington, D. C."